UNITED STATES PATENT OFFICE.

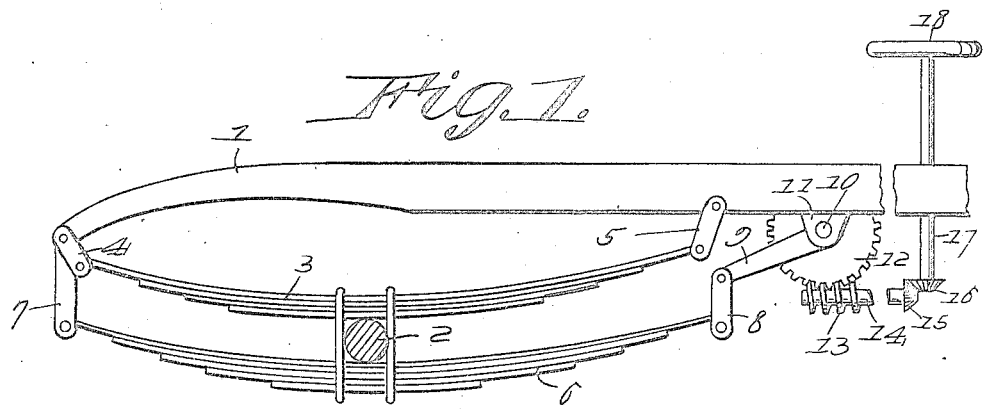
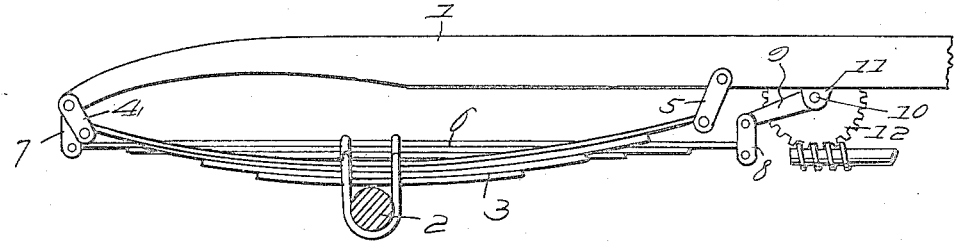
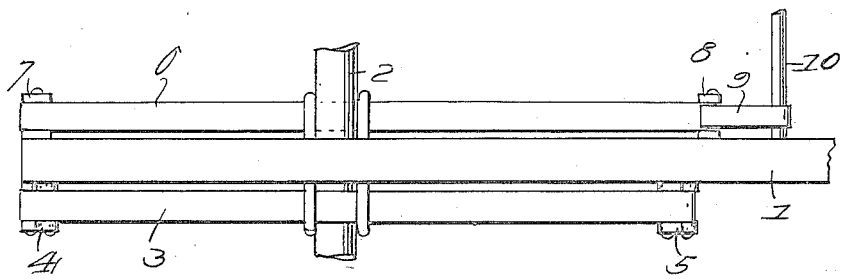

PAUL R. NEFF, OF BUCYRUS, OHIO.

AUXILIARY SPRING.

1,377,913.  Specification of Letters Patent.  Patented May 10, 1921.

Application filed July 25, 1919. Serial No. 313,234.

*To all whom it may concern:*

Be it known that PAUL R. NEFF, a citizen of the United States, residing at Bucyrus, in the county of Crawford and State of Ohio, has invented new and useful Improvements in an Auxiliary Spring, of which the following is a specification.

The object of the invention is to provide an improved spring suspension for vehicles particularly motor cars, and it consists of a double set of springs—that is, two springs which normally take the place of one and carry the load equally. The one is mounted as is usual, while the other is held in such a manner that it may be relieved of its share of the load. Thus the first spring proportioned for a light load carries the said load with easy action free from any stiffness which would be present if the said spring were designed for a maximum load. The auxiliary spring, which is the subject of this invention, is shackled to an arm which is raised or lowered to increase or decrease the pressure upon the said auxiliary spring. As it is impossible to make a single spring that will respond to widely varying loads with equal ease and to yield properly to any inequality in the load, the invention which provides for this adjustable auxiliary spring makes it possible to build a vehicle which, whether empty or loaded, will ride with the greatest smoothness. Thus the invention provides for the more comfortable use of a vehicle and the increase of life of its parts to a maximum.

Other and further objects appear in the following description wherein the invention is set forth in detail.

To the exact construction in which it is set forth, the invention is not to be restricted. The right is reserved to make such changes or alterations as the actual reduction to practice may suggest, in so far as such changes or alterations are compatible in spirit with the annexed claims.

In the accompanying drawings:

Figure 1 is a view in side elevation showing one plan of mounting the improved spring.

Fig. 2 is a view similar to Fig. 1 but showing a modified form of mounting the spring.

Fig. 3 is a top plan view of the structure of Fig. 1.

Referring to the drawings, there is shown the forward end of one of the side rails 1 of an auto vehicle chassis, the axle of the auto being indicated at 2. The invention does not contemplate doing away with the usual spring and this spring is therefore shown and indicated at 3, being secured on top of the axle as shown and having its ends shackled to the rail as indicated at 4 and 5. The auxiliary spring 6 is secured to the axle as shown and at its forward end is connected with the rail 1 by means of the shackle 7, the rear end of this spring being connected with the shackle 8 which in turn is pivotally connected with an arm 9, the latter being carried on a shaft 10 which is supported in suitable bearing members 11 mounted on the two side rails 1, one of which only is shown in the present disclosure of the invention. The shaft 10 carries a worm wheel 12 which is in mesh with a worm 13 carried on the longitudinally disposed shaft 14, the latter at the end remote from the worm being provided with a bevel gear 15 which meshes with a corresponding gear 16 carried by a vertically disposed rotatable shaft 17 at the upper end of which there is provided a hand wheel 18 by means of which the shaft 17 may turn.

Obviously the turning of the shaft 17 by means of the hand wheel will serve to turn the shaft 10 in its bearings and thus raise and lower the arm 9 which, if raised, will decrease the pressure on the spring 6 and if the machine be lightly loaded will thus impose all the load on the spring 3. If the machine be heavily loaded and it is desired to give the body thereof the same motion as it had when lightly loaded, the shaft 17 is rotated to shift the arm 9 downward and thus impose a pressure upon the spring 6 and cause the latter to bear its share of the load along with the spring 5.

Then, in Fig. 2 the construction is substantially the same as that shown in Fig. 1 with the exception that the auxiliary spring 6 is disposed on top of rather than under the axle 2. The operation of the spring in this construction is, however, the same as with the construction shown in Fig. 1.

From the foregoing description and the accompanying drawings, it is believed a clear enough understanding of the invention is to be had to render further description unnecessary.

The invention having been described, what is claimed as new and useful is:

1. In a vehicle spring suspension, the combination with a chassis frame and main spring to bear the minimum load thereof, of an auxiliary spring shackled at one end to the chassis frame, a transverse rock shaft mounted on the chassis frame, an arm carried by the rock shaft and shackled to the remaining end auxiliary spring, and means to impart angular movement to the rock shaft and thereby vary the position of the arm relative to the frame whereby pressure is exerted on the auxiliary spring to cause it to bear a certain proportion of the load of the frame.

2. In a vehicle spring suspension, the combination with a chassis frame and main spring to bear the minimum load thereof, of an auxiliary spring shackled at one end to the chassis frame, a transverse rock shaft mounted on the chassis frame, an arm carried by the rock shaft and shackled to the remaining end of the auxiliary spring, a worm gear mounted on the rock shaft, a horizontally disposed shaft arranged longitudinally of the frame, a worm carried by said horizontal shaft and meshing with the worm gear, a vertically disposed shaft carried by the frame and provided at the upper end with a hand wheel, and a bevel gear couple operatively connecting the vertically disposed and horizontally disposed shafts for imparting angular movement to the rock shaft to vary the position of the said arm for the purpose specified.

In testimony whereof I affix my signature.

PAUL R. NEFF.